United States Patent [19]
Böhm et al.

[11] Patent Number: 5,917,100
[45] Date of Patent: Jun. 29, 1999

[54] PROCESS FOR PRODUCING LOW MOLECULAR-WEIGHT POLY-1-OLEFINS

[75] Inventors: Ludwig Böhm, Hattersheim/Main; Hans-Friedrich Herrmann, Darmstadt; Joachim Berthold, Eppstein/Taunus; Gerd Hohner, Gersthofen; Rainer Lecht, Kelkheim (Taunus); Hans Joachim Vetter, Bad Soden/Ts, all of Germany

[73] Assignee: Clariant GmbH, Germany

[21] Appl. No.: 08/864,211

[22] Filed: May 28, 1997

Related U.S. Application Data

[63] Continuation of application No. 08/580,045, Dec. 20, 1995, abandoned, which is a continuation of application No. 08/177,540, Jan. 5, 1994, abandoned.

[30] Foreign Application Priority Data

Jan. 7, 1993 [DE] Germany .............................. 43 00 196

[51] Int. Cl.$^6$ .............................. C10L 1/16; C07C 2/24; C08F 4/654
[52] U.S. Cl. .......................... 585/9; 526/124.7; 526/352; 526/905; 585/512; 585/523; 585/524
[58] Field of Search .............................. 526/124.2, 124.7; 585/9, 512, 524

[56] References Cited

U.S. PATENT DOCUMENTS

| | | | |
|---|---|---|---|
| 3,833,515 | 9/1974 | Amtmann et al. | 526/124.2 |
| 3,933,934 | 1/1976 | Bailly et al. | 526/124.2 |
| 5,292,837 | 3/1994 | Heinrich et al. | |

FOREIGN PATENT DOCUMENTS

| | | | |
|---|---|---|---|
| 644003 | 12/1993 | Australia . | |
| 0 526 891 | 2/1993 | European Pat. Off. . | |
| 40 17 661 | 12/1991 | Germany . | |
| 4017661 | 12/1991 | Germany . | |
| 1311013 | 3/1973 | United Kingdom | 526/905 |
| 1329334 | 9/1973 | United Kingdom | 526/905 |

OTHER PUBLICATIONS

*Included as English Equivalent of German 4,017,661.

*Primary Examiner*—Edward J. Smith
*Attorney, Agent, or Firm*—Connolly & Hutz

[57] ABSTRACT

A catalyst formed by the reaction of a magnesium alkoxide dispersion having a particle size of from 100 to 3000 nm with a compound of a metal selected from the group comprising titanium, zirconium, vanadium and chromium and then with a chlorine-containing organoaluminum compound possesses a very good hydrogen responsiveness and a high activity even in the presence of molecular-weight regulators such as hydrogen. The catalyst is therefore outstandingly suitable for the production of low molecular-weight polyolefins. The catalyst makes possible the production of waxes having a reduced residual ash content. The large particle diameter and the low fines content of the polymer powder produced by suspension polymerization with this catalyst enables easy removal of the suspension medium and drying. The catalyst is furthermore advantageously used in solution polymerization and, because of the large particle diameter, in gas phase polymerization for producing low molecular-weight poly-1-olefins.

16 Claims, No Drawings

PROCESS FOR PRODUCING LOW MOLECULAR-WEIGHT POLY-1-OLEFINS

This application is a continuation of Ser. No. 580,045, filed Dec. 20, 1995, which is a continuation of Ser. No. 177,540, filed Jan. 5, 1994, all now abandoned.

The invention relates to a process for producing low molecular-weight poly-1-olefins using a catalyst based on a magnesium alkoxide dispersion in saturated hydrocarbons or hydrocarbon mixtures.

Reaction of magnesium alkoxides $Mg(OR^1)(OR^2)$ or "complex" magnesium alkoxides with compounds of titanium, zirconium, vanadium or chromium produces solids which together with organometallic compounds of the 1st to 3rd main groups of the Periodic Table give excellent catalysts for olefin polymerization.

It is known that 1-olefins can be polymerized in the presence of a mixed catalyst, the transition metal component of which has been prepared by reaction of magnesium alkoxides with tetravalent halogen-containing titanium compounds (cf. U.S. Pat. No. 3,644,318). The magnesium alkoxides are used as pulverulent commercial products.

A further process is known in which a dissolved magnesium alkoxide is reacted with a halogen-containing Ti or V compound and a transition metal alkoxide (cf. EP 319 173). The catalyst particles formed thereby are spherical and possess an average particle size of from 10 to 70 μm.

Also known is the preparation of a catalyst component (cf. EP 223 011) by reaction of a tetravalent halogen-containing titanium compound with a magnesium alkoxide containing at least 40% by weight of particles with a diameter of less than 63 μm. A magnesium alkoxide having this particle size is obtained, inter alia, by milling in a ball mill.

A problem with the production of low molecular-weight polyolefins with such catalysts is the severe decrease in activity on regulation with hydrogen. For catalysts prepared by reaction of titanium tetrachloride and magnesium ethoxide, activities of less than 300 g/mmol of Ti have been given for the production of polyolefin waxes (cf. DE 19 29 863).

It has been found that catalysts with high to very high activity, even with regulation of the molecular weight with hydrogen, which also give the opportunity of controlling the particle size distribution of the polymer are obtained if the magnesium alkoxide is used as a dispersion in a saturated hydrocarbon or hydrocarbon mixture, which has been obtained by intensive shearing of the magnesium alkoxide suspension.

The invention therefore provides a process for producing a low molecular-weight poly-1-olefin having a viscosity number of less than 100 cm³/g by homo- or copolymerization of a 1-olefin having the formula $R^4CH=CH_2$, in which $R^4$ is a hydrogen atom or an alkyl radical having from 1 to 10 carbon atoms, in suspension, in solution or in the gas phase at a temperature of from 20 to 200° C. and a pressure of from 0.5 to 50 bar in the presence of a catalyst comprising the reaction product of a magnesium alkoxide dispersion, the particle size of which is from 100 to 3000 nm, with a transition metal compound and an organoaluminum compound (component a) and also an organometallic compound of a metal of group I, II, or III of the Periodic Table (component b), which comprises carrying out the polymerization in the presence of a catalyst, component a of which has been prepared by reacting the magnesium alkoxide dispersion with a compound of a metal selected from the group comprising titanium, zirconium, vanadium and chromium and then with a chlorine-containing organoaluminum compound.

The invention further relates to the preparation of the catalyst used in this process.

Component a is prepared using a commercially available magnesium alkoxide. This magnesium alkoxide can be a "simple" magnesium alkoxide of the formula $Mg(OR^1)(OR^2)$, in which $R^1$ and $R^2$ are identical or different and are an alkyl radical having from 1 to 6 carbon atoms. Examples are $Mg(OC_2H_5)_2$, $Mg(OiC_3H_7)_2$, $Mg(OnC_4H_9)_2$, $Mg(OCH_3)(OC_2H_5)$, $Mg(OC_2H_5)(OnC_3H_7)$. A "simple" magnesium alkoxide of the formula $Mg(OR)_nX_m$ can also be used, in which X is halogen, $(SO_4)_{1/2}$, OH, $(CO_3)_{1/2}$, $(PO_4)_{1/3}$, or Cl, R has the abovementioned meanings of $R^1$ or $R^2$ and n+m=2.

However, a "complex" magnesium alkoxide can also be used. By "complex" magnesium alkoxide is meant a magnesium alkoxide which contains, besides magnesium, at least one metal of the 1st to 4th main groups of the Periodic Table. Examples of such a "complex" magnesium alkoxide are $[Mg(OiC_3H_7)_4]Li_2$, $[Al_2(OiC_3H_7)_8]Mg$, $[Si(OC_2H_5)_6]Mg$, $[Mg(OC_2H_5)_3]Na$, $[Al_2(OiC_4H_9)_8]Mg$, $[Al_2(O\text{-sec-}C_4H_9)_6(OC_2H_5)_2]Mg$.

The "complex" magnesium alkoxides are prepared by known methods. Examples of the preparation are:

1. Two metal alkoxides are reacted with one another in a suitable solvent, for example

2. Dissolution of magnesium in an alcoholic solution of a metal alkoxide

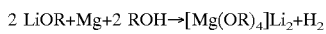

3. Simultaneous dissolution of two metals in an alcohol

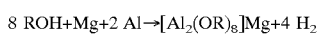

Preference is given to using the simple magnesium alkoxides, in particular $Mg(OC_2H_5)_2$, $Mg(OnC_3H_7)_2$ and $Mg(OiC_3H_7)_2$.

Commercial $Mg(OC_2H_5)_2$ generally has the following specification:

Mg content 21–22% by weight

Total $Mg(OH)_2+MgCO_3 \leq 1\%$ by weight $C_2H_5OH$ content<0.3% by weight

The average particle diameter is 500 μm. 90% of the particles have a particle diameter in the range from 200 to 1200 μm.

The commercial magnesium alkoxide is suspended in an inert saturated hydrocarbon or hydrocarbon mixture. This suspension is converted under a protective gas (Ar, $N_2$) in a reactor by means of a high-speed mixer (homogenizer) (e.g. ®Ultra-Turrax or ®Dispax, IKA-Maschinenbau Janke & Kunkel GmbH) into a magnesium alkoxide dispersion.

The magnesium alkoxide suspension (see also Römpp's Chemielexikon, Frank'sche Verlagsanstalt, Stuttgart, 8th edition (1987), page 4067) contains the magnesium alkoxide as solid insoluble particles in the saturated hydrocarbon or hydrocarbon mixture. This suspension is turbid and not transparent. It shows Newtonian behavior (see also W:-M. Kulicke, Fließverhalten von Stoffen und Stoffgemischen [Flow behaviour of materials and mixtures of materials], H üthig & Wepf Verlag, Basel, 1986, p. 29) and at 25° C. has a viscosity of from 0.0003 to 0.0008 Pa.s. If this magnesium alkoxide suspension is treated with the high-speed mixer (homogenizer) at 25° C., there is observed over a period of about ½ h a rapid comminution of the suspended particles, a strong increase in turbidity and a rise in the viscosity to from 0.0015 to 0.0025 Pa.s. Over a further period of time (from about 2 to 8 hours) the turbidity disappears and the viscosity rises further to from 0.006 to 0.010 Pa.s. The magnesium alkoxide particles can no longer be seen. A magnesium alkoxide dispersion (lyogel) has been formed. These magnesium alkoxide dispersions (1.2 mol of magnesium ethoxide/dm$^3$ of diesel oil) no longer show Newtonian behavior. The shear viscosity is measured as a function of the shear rate with a rotation viscometer at 25° C. These magnesium alkoxide dispersions have pseudoplastic flow behavior. Pseudoplastic flow behavior is characterized by shear flow commencing only above a certain shear stress (in the above case, 1.2 mol of magnesium ethoxide/dm$^3$ of diesel oil ($C_{10}/C_{11}$ petroleum fraction), at about 2 Pa) and by the shear viscosity then assuming a constant value (here 0.006 Pa.s).

If this magnesium alkoxide dispersion is greatly diluted with saturated hydrocarbons or hydrocarbon mixtures (1:100), the average diameter of the magnesium alkoxide particles can be determined by dynamic light scattering using a measuring apparatus (®Malvern System 4700). It is in the range from 100 to 3000 nm (0.1 to 3 $\mu$m). This means that the average particle diameter (about 500 $\mu$m) has decreased by a factor of more than 100.

The magnesium alkoxide dispersion is distinguished from the suspension by two essential features. It is, as shown above, substantially more viscous than the suspension and the dispersed magnesium alkoxide undergoes sedimentation much more slowly and to a much lesser extent (several hours) than the suspended magnesium alkoxide.

Suitable inert saturated hydrocarbons are aliphatic or cycloaliphatic hydrocarbons, such as butane, pentane, hexane, heptane, isooctane, cyclohexane, methylcyclohexane, and also aromatic hydrocarbons such as toluene, xylene; fractious hydrogenated diesel oil fractions or gasoline fractions which have carefully freed of oxygen, sulfur compounds and moisture can also be used.

For the preparation of the catalyst component a, the magnesium alkoxide dispersion which has been prepared in this way in a saturated hydrocarbon is first reacted in one or more stages with a titanium compound ($TiCl_4$, $Ti(OR)_4$, inter alia), zirconium compound ($ZrCl_4$, $Zr(OR)_4$, inter alia), vanadium compound ($VCl_4$, $VOCl_3$, inter alia) or chromium compound ($CrO_2Cl_2$, inter alia) and subsequently with an organoaluminum compound.

In this process, the magnesium alkoxide dispersion is reacted in the 1st step with the transition metal compound at a temperature of from 50 to 100° C., preferably from 60 to 90° C., in the presence of a saturated hydrocarbon or hydrocarbon mixture while stirring. Per mol of magnesium alkoxide, from 0.1 to 5 mol of transition metal compound is used, preferably from 0.1 to 2 mol of transition metal compound per mol of magnesium alkoxide. The, reaction time is from 0.5 to 8 hours, preferably from 2 to 6 hours.

This suspension is reacted in a 2nd step at a temperature of from 60 to 140° C., preferably from 80 to 120° C., over a time period of from 0.2 to 8 hours, preferably from 0.5 to 6 hours, with an organoaluminum component in a ratio of from 0.3 to 3 mol of aluminum, preferably from 0.5 to 2.0 mol Al, per mol of magnesium. Suitable organoaluminum compounds are chlorine-containing organoaluminum compounds such as dialkylaluminum monochlorides of the formula $(R^3)_2AlCl$ or alkylaluminum sesquichlorides of the formula $(R^3)_3Al_2Cl_3$, in which the radical $R^3$ is an alkyl radical having from 1 to 16 carbon atoms. Examples are $(C_2H_5)_2AlCl$, $(i-C_4H_9)_2AlCl$, $(C_2H_5)_3Al_2Cl_3$. Mixtures of these compounds can also be used.

There results a hydrocarbon-insoluble, magnesium- and transition metal-containing solid which is designated as component a. This can be washed by repeated decanting of the suspension and used in suspension, or first isolated as a solid, stored and resuspended for further use later.

The preparation of the polymerization catalyst to be used according to the invention is by reaction of component a with an organometallic compound of a metal of group I, II or III of the Periodic Table (component b). Preferred components b are organoaluminum compounds. Suitable organoaluminum compounds are chlorine-containing organoaluminum compounds such as dialkylaluminum monochlorides of the formula $R^3_2AlCl$ or alkylaluminum sesquichlorides of the formula $R^3_3Al_2Cl_3$, in which $R^3$ is an alkyl radical having from 1 to 16 carbon atoms. Examples are $(C_2H_5)_2AlCl$, $(iC_4H_9)_2AlCl$, $(C_2H_5)_3Al_2Cl_3$. Mixtures of these compounds can also be used.

Particular preference is given to using chlorine-free compounds as the organoaluminum compounds. One group of suitable compounds of this type comprises the reaction products of trialkylaluminums or dialkylaluminum hydrides having hydrocarbon radicals containing from 1 to 6 carbon atoms, preferably $Al(iC_4H_9)_3$ or $Al(iC_4H_9)_2H$, with diolefins containing from 4 to 20 carbon atoms, preferably isoprene. An example is isoprenylaluminum.

Another suitable group of such chlorine-free organoaluminum compounds comprises trialkylaluminums of the formula $AlR^3_3$ or dialkylaluminum hydrides of the formula $AlR^3_2H$, in which $R^3$ is an alkyl radical having from 1 to 16 carbon atoms. Examples are $Al(CH_3)_3$, $Al(C_2H_5)_3$, $Al(C_2H_5)_2H$, $Al(C_3H_7)_3$, $Al(C_3H_7)_2H$, $Al(iC_4H_9)_3$, $Al(iC_4H_9)_2H$, $Al(C_8H_{17})_3$, $Al(C_{12}H_{25})_3$, $Al(C_2H_5)(C_{12}H_{25})_2$, $Al(iC_4H_9)(C_{12}H_{25})_2$.

Mixtures of organometallic compounds of metals of group I, II or III of the Periodic Table, in particular mixtures of various organoaluminum compounds, can also be used. Examples of mixtures are: $Al(C_2H_5)_3$ and $Al(iC_4H_9)_3$, $Al(C_2H_5)_2Cl$ and $Al(C_8H_{17})_3$, $Al(C_2H_5)_3$ and $Al(C_8H_{17})_3$, $Al(C_4H_9)_3$ and $Al(C_8H_{17})_3$, $Al(iC_4H_9)_3$ and $Al(C_8H_{17})_3$, $Al(C_2H_5)_3$ and $Al(C_{12}H_{25})_3$, $Al(iC_4H_9)_3$ and $Al(C_{12}H_{25})_3$, $Al(C_2H_5)_3$ and $Al(C_{16}H_{33})_3$, $Al(C_3H_7)_3$ and $Al(C_{18}H_{37})_2(iC_4H_9)$, $Al(C_2H_5)_3$ and isoprenylaluminum (reaction product of isoprene with $Al(iC_4H_9)_3$ or $Al(iC_4H_9)_2H$).

Mixing of component a and component b can be carried out prior to polymerization in a stirred reactor at a temperature of from −30 to 150° C., preferably from −10 to 120° C. It is also possible to combine the two components directly in the polymerization reactor at a temperature of from 20 to 200° C. However, the addition of component b can also be carried out in two steps, wherein component a is preactivated prior to the polymerization reaction with part of component b at a temperature of from −30 to 150° C. and the further addition of component b is carried out in the polymerization reactor at a temperature of from 20 to 200° C.

The polymerization catalyst to be used according to the invention is used for the polymerization of 1-olefins of the formula $R^4$—$CH=CH_2$, in which $R^4$ is a hydrogen atom or an alkyl radical having from 1 to 10 carbon atoms, for example ethylene, propylene, but-1-ene, hex-1-ene, 4-methylpent-1-ene, oct-1-ene.

Preferably, ethylene or propylene are polymerized alone or copolymerized in admixture with another 1-olefin of the above formula.

In particular, ethylene alone or a mixture of at least 80% by weight of ethylene and a maximum of 20% by weight of another 1-olefin of the above formula is polymerized.

The polymerization is carried out in a known manner in solution, in suspension or in the gas phase, continuously or batchwise, in one or more stages at a temperature of from 20 to 200° C., preferably from 50 to 150° C. The pressure is from 0.5 to 50 bar. Preferably the polymerization is carried out in the pressure range from 5 to 30 bar, which is of particular interest in industry.

The component a is used in a concentration, based on transition metal, of from 0.0001 to 1 mmol, preferably from 0.001 to 0.5 mmol, of transition metal per $dm^3$ of dispersion medium. The organometallic compound b is used in a concentration of from 0.1 to 5 mmol, preferably from 0.5 to 4 mmol, per $dm^3$ of dispersion medium. However, in principle higher concentrations are also possible.

The suspension or solution polymerization is carried out in an inert solvent customarily used in the Ziegler low-pressure process, for example in an aliphatic or cycloaliphatic hydrocarbon; examples of such solvents are butane, pentane, hexane, heptane, isooctane, cyclohexane, methylcyclohexane. Furthermore, gasoline fractions or hydrogenated diesel oil fractions which have been carefully freed of oxygen, sulfur compounds and moisture can be used.

The gas phase polymerization can be carried out directly or after prepolymerization of the catalyst in a suspension process.

The molecular weight of the polymer is controlled in a known manner, preferably using hydrogen.

The catalyst possesses very good hydrogen responsiveness and high activity even in the presence of molecular-weight regulators such as hydrogen. This makes the catalyst outstanding for the preparation of low molecular-weight polyolefins.

The catalyst makes possible the production by solution polymerization of waxes having a reduced residual ash content. Furthermore, the large particle size of the polymer particles which can be produced with this catalyst makes it possible to carry out the production of low molecular-weight polyolefins by suspension polymerization. The large particle diameter and the low fines content of the polymer powder enables easy removal of the suspension medium and drying.

Furthermore, the process of the invention makes it possible to prepare catalysts in such a way as to enable control of the particle size distribution and, to a certain extent, also the particle shape of the polymer powder produced.

In general an improved particle morphology, higher average particle diameters ($d_{50}$ values), a narrow particle size distribution, no coarse and fine fractions, and high catalyst productivities are obtained.

In the Examples a hydrogenated diesel oil fraction having a boiling range from 130 to 170° C. was used for catalyst preparation and for polymerization. The average particle diameter $d_{50}$ and the proportion of fines<100 μm of polymer powders were determined by sieve analysis. The ratio Mg:Ti:Cl was determined by conventional analytical methods after decomposition of the catalyst suspension with sulfuric acid.

EXAMPLE 1

1.2 mol (=137 g) of commercially available $Mg(OC_2H_5)_2$ (Mg content from 21 to 22% by weight, $C_2H_5OH$ content<0.3% by weight, average particle diameter 500 μm, 90% of the particles having a particle diameter in the range from 200 to 1200 μm) were suspended in 1.0 $dm^3$ of diesel oil. The magnesium ethoxide particles are insoluble in the hydrocarbon mixture and formed a suspension.

This suspension was converted in a cylindrical glass vessel under protective gas (Ar, $N_2$) with exclusion of air ($O_2$) and moisture ($H_2O$) into a magnesium ethoxide/diesel oil dispersion by means of a commercially available mixer (homogenizer) (®ULTRA-TURRAX T 50, Janke & Kunkel GmbH & Co. KG, D-79219 Staufen). Starting at room temperature, this procedure took at least 3 hours. The vessel needed to be strongly cooled, so as to prevent the temperature in the vessel from rising greatly (at most to 50° C.).

The magnesium ethoxide/diesel oil suspension contained the magnesium ethoxide particles in suspended form. Without stirring, these particles settled in about 10 minutes into the lower part of the vessel. The shear viscosity of this suspension was 0.00065 Pa.s at 25° C. The magnesium ethoxide/diesel oil suspension was therefore nonviscous and contained coarse particles of magnesium ethoxide (from 200 to 1200 μm). After switching on the mixer the following could be observed: in the course of half an hour the suspended magnesium ethoxide particles were rapidly comminuted. This was associated with a strong increase in turbidity and a rise in viscosity. The viscosity (measured with a rotation viscometer from Haake) rose to 0.0020 Pa.s. Over a further period of time the viscosity rose further to from 0.006 to 0.010 Pa.s. and the suspended particles disappeared. A magnesium ethoxide/diesel oil dispersion (lyogel) had been formed. The average particle size determined by means of a ®Malvern System 4700 (for this measurement the dispersion had to be diluted with diesel oil by a factor of 1:100) was from 100 to 3000 nm (0.1 to 3 μm).

In comparison with the magnesium ethoxide/diesel oil suspension, the magnesium ethoxide/diesel oil dispersion showed the following characteristic differences: the average particle size sank from about 500 μm to from 100 to 3000 nm. The magnesium ethoxide/diesel oil suspension showed Newtonian flow behavior with a viscosity of 0.00065 Pa.s/25° C. The magnesium ethoxide/diesel oil dispersion, on the other hand, showed pseudoplastic behavior with a substantially higher viscosity of 0.006 Pa.s/25° C. Flow commenced at a shear stress of about 2.0 Pa.

After sedimentation, the sedimentation volume of this magnesium alkoxide/diesel oil dispersion could be determined. At a magnesium alkoxide content of 137 g in 1 $dm^3$ of diesel oil it was from 30 to 40% by volume. The sediment had a gray color and was a thixotropic lyogel of high viscosity. If the vessel was turned the lyogel remained on the bottom of the vessel and separated from the diesel oil. On vigorous shaking, the lyogel formed a low-viscosity dispersion with the supernatant diesel oil.

This magnesium ethoxide/diesel oil )Aspersion was reacted with a transition metal compound of group IV to VI of the Periodic Table of the Elements.

A 4 $dm^3$ four-necked flask was charged under inert gas with 1 mol of the $Mg(C_2H_5)_2$/diesel oil dispersion and this .was diluted with diesel oil to a total volume of 1.3 $dm^3$. The mixture was heated to 85° C. while stirring at 150 rpm. At this temperature and a stirring rate of 70 rpm, 660 $cm^3$ of a solution of 0.3 mol of $TiCl_4$ in diesel oil were added dropwise at a uniform rate over a period of 4 hours. Subsequently the suspension was stirred for a further 0.5 hour at 85° C. Then, at 200 rpm, the temperature was raised to 110° C. and at this temperature 830 $cm^3$ of a solution containing 750 mmol of $Al_2Cl_3(C_2H_5)_3$ in diesel oil were added dropwise at a uniform rate over a period of 2 hours. After a further 2 hours at 110° C. the stirrer motor was switched off and the suspension was cooled. After cooling to room temperature the catalyst was freed of soluble residual material by decanting and refilling the supernatant clear solution six times. The molar ratio Mg:Ti:Cl of the finished catalyst component a was about 1:0.3:2.4.

EXAMPLE 2

A 40 dm³ reactor was charged under inert conditions with 15 dm³ of diesel oil (boiling range 140–160° C.) and this was heated to 140° C. The total pressure was increased with hydrogen to 10 bar and then with ethylene to 15 bar. In parallel to this, 15 mmol (based on Ti) of catalyst component a from Example 1 was mixed with 90 mmol of triethylaluminum in 1.5 dm³ of diesel oil to prepare the catalyst. At 140° C., 0.5 dm³ of this catalyst suspension and, after commencement of polymerization, 4 kg/h of ethylene and 0.5 kg/h of hydrogen were metered in. Over a period of 1 hour the pressure was kept constant at 15 bar by metering in further catalyst and subsequently the polymer solution was worked up by distilling off the solvent. At a yield of 3.8 kg, 8.7 mmol (based on Ti) of the catalyst suspension, corresponding to 0.44 kg/mmol of Ti, were used. The melt viscosity of the product at 140° C. was 220 mPa.s.

Comparative Example A

Example 2 was repeated, but in place of the catalyst component a from Example 1 the supported catalyst according to DE 19 29 863, Example 1, was used in an amount of 35 mmol, based on Ti, per 1.5 dm³. For a yield of 3.8 kg, 33.8 mmol (based on Ti) of the catalyst suspension, corresponding to 0.11 kg/mmol of Ti, were used. The melt viscosity of the product at 140° C. was 350 mPa.s.

EXAMPLE 3

A 50 dm³ reactor was charged under nitrogen with 45 dm³ of diesel oil and 45 mmol of $Al(C_2H_5)_3$ and, at a constant temperature of 83° C., 7.8 bar of hydrogen. Operating in a continuous mode, 0.34 mmol Ti/h of the catalyst component a from Example 1, mixed with 4.8 mmol Al/h of $Al(C_2H_5)_3$, and at the same time 3.0 kg/h of ethylene, 5.2 g/h of hydrogen and 240 cm³/h of 1-butene were metered in. After establishment of equilibrium, the activity was 8.8 kg/mmol titanium at a total pressure of 8.9 bar. The product could be easily separated from the dispersion medium by pressure filtration. The product parameters are summarized in Table 1.

EXAMPLE 4

The polymerization of Example 3 was repeated, initially charging hydrogen at 6.9 bar and metering in a further 5 g/h. A metering-in rate of 0.39 mmol Ti/h of the catalyst component a from Example 1 resulted in a reactor pressure of 8.0 bar. The product parameters are summarized in Table 1.

EXAMPLE 5

The polymerization of Example 3 was repeated, initially charging hydrogen at 6.6 bar and metering in a further 4.5 g/h. A metering-in rate of 0.28 mmol Ti/h of the catalyst component a from Example 1 resulted in a reactor pressure of 8.0 bar. The product parameters are summarized in Table 1.

EXAMPLE 6

The polymerization of Example 3 was repeated, initially charging hydrogen at 7.5 bar and metering in a further 5 g/h. A metering-in rate of 0.19 mmol Ti/h of the catalyst component a from Example 1 resulted in a reactor pressure of 8.0 bar. The product parameters are summarized in Table 1.

EXAMPLE 7

The polymerization of Example 3 was repeated, initially charging hydrogen at 4.2 bar and metering in a further 2.2 g/h. A metering-in rate of 0.16 mmol Ti/h of the catalyst component a from Example 1 resulted in a reactor pressure of 7.9 bar. The product parameters are sum- marized in Table 1.

EXAMPLE 8

The polymerization of Example 3 was repeated, adding no 1-butene and initially charging hydrogen at 8 bar and metering in a further 4.8 g/h. A metering-in rate of 0.43 mmol Ti/h of the catalyst component a from Example 1 resulted in a reactor pressure of 10.3 bar. The product parameters are summarized in Table 1.

EXAMPLE 9

The polymerization of Example 8 was repeated, initially charging hydrogen at 6.3 bar and metering in a further 4.2 g/h. A metering-in rate of 0.39 mmol Ti/h of the catalyst component a from Example 1 resulted in a reactor pressure of 8.7 bar. The product parameters are summarized in Table 1.

EXAMPLE 10

The polymerization of Example 8 was repeated, initially charging hydrogen at 5.4 bar and metering in a further 2.2 g/h. A metering-in rate of 0.24 mnol Ti/h of the catalyst component a from Example 1 resulted in a reactor pressure of 8.8 bar. The results are summarized in Table 1.

EXAMPLE 11

A 5 m³ reactor was filled under inert conditions with 3 m³ of diesel oil and 3 mol of $Al(C_2H_5)_3$ and charged with 15 bar of hydrogen at a temperature of 140° C. In a continuous mode of operation, 600 kg/h of ethylene, 145 dm³/h of propylene and 119 mmol Ti/h of the catalyst component a from Example 1, mixed with 500 mmol/h of $Al(C_2H_5)_3$, were passed in, resulting in a reactor pressure of 18.5 bar. The hydrogen was maintained at a constant 54% by volume in the gas phase. The solution of the product was taken off continuously and the reactor level was maintained by addition of about 700 dm³/h of diesel oil. An activity of 5.7 kg/mmol Ti resulted in a product which, after separation from the solvent, possessed a VN of 21 cm³/g, a melt viscosity (140° C.) of 520 mPa.s, a density of 0.932 g/cm³ and a DSC melting point of 116° C.

EXAMPLE 12

The polymerization of Example 11 was repeated, passing in 500 kg/h of ethylene and 140 mmol Ti/h of the catalyst component a from Example 1 mixed with 900 mmol/h of $Al(C_2H_5)_3$. Unlike Example 10, no propylene was added and the hydrogen in the gas phase was maintained at a constant 73% by volume, resulting in a reactor pressure of 19.8 bar. An activity of 3.57 kg/mmol Ti resulted in a product which, after separation from the solvent, possessed a VN of 14.5 cm³/g, a melt viscosity (140° C.) of 110 mPa.s, a density of 0.97 g/cm³ and a DSC melting point of 128° C.

Comparative Example B

Example 3 was repeated with the supported catalyst according to Example 1 of DE 19 29 863, initially charging the same amount of hydrogen. The catalyst was metered in at 3.4 mmol Ti/h mixed with 48 mmol/h of $Al(C_2H_5)_3$. Ethylene, hydrogen and 1-butene were metered in as in example 3 to a final pressure of 9 bar. The product obtained could not be filtered on a pressure filter, since the customary filter cloth (mesh opening about 50 μm) quickly became blocked. A sample of the suspension was completely evaporated and after drying in vacuo a viscosity number of 64 cm³/g was determined. The catalyst yield calculated from the ethylene uptake was about 0.5 kg/mmol Ti. This supported catalyst could therefore not be controlled well with hydrogen in this range and was unsuitable for the suspension polymerization.

TABLE 1

Summary of the experiments
(CA: catalyst activity; mv: dynamic viscosity of the melt; VN: viscosity number; BD: bulk density; n.d.: value not determined)

| Example No. | CA (kg/mmol Ti) | Density (g/cm³) | mv (140° C.) (mPa.s) | VN (cm³/g) | BD (g/dm³) | $d_{50}$ (μm) | <100 μm % by weight |
|---|---|---|---|---|---|---|---|
| 2 | 0.44 | n.d. | 220 | 17.2 | n.d. | n.d. | n.d. |
| 3 | 8.8 | 0.954 | 17200 | 48 | 270 | 276 | 3 |
| 4 | 7.6 | 0.953 | 26200 | 53 | 330 | 258 | 7 |
| 5 | 10.6 | 0.953 | 33600 | 57 | 330 | 270 | 6 |
| 6 | 15.6 | 0.953 | 80000 | 69 | 370 | 284 | 9 |
| 7 | 18.3 | 0.950 | n.d. | 100 | 380 | 303 | 7 |
| 8 | 6.9 | 0.971 | 47400 | 61 | 375 | 211 | 13 |
| 9 | 7.6 | 0.970 | n.d. | 73 | 430 | 231 | 9 |
| 10 | 12.4 | 0.966 | n.d. | 100 | 410 | 269 | 7 |
| 11 | 5.7 | 0.932 | 520 | 21 | n.d. | n.d. | n.d. |
| 12 | 3.6 | 0.970 | 110 | 14.5 | n.d. | n.d. | n.d. |

What is claimed is:

1. A process for producing a low molecular-weight ethylene polymer having a visosity number of less than 100 cm³/g by homopolmerization of ethylene copolymerization thereof with up to 20% by weight of a 1-olefin having the formula $R^4$—CH═CH, in which $R^4$ is a hydrogen atom or an alkyl radical having from 1 to 10 carbon atoms, in suspension at a pressure of from 0.5 to 50 bar in the presence of hydrogen and in the presence of a catalyst comprising the reaction product of a dispersion of a magnesium alkoxide having the formula $Mg(OR^1)(OR^2)$ in which $R^1$ and $R^2$ are identical or different and are an alkyl radical having from 1 to 6 carbon atoms, the particle size of which is from 100 to 3000 nm, with a titanium compound which is $TiCl_4$ and an organoaluminum compound (component a) and also an organoaluminum compound (component b), wherein said organoaluminum compound is $AlR^3{}_3$, $AlR^3{}_2Cl$, $Al_2R^3{}_3Cl_2$, or $AlR^3{}_2H$ in which $R^3$ is identical or different and are an alkyl radical having from 1 to 16 carbon atoms, which comprises carrying out the polmerization in the presence of a catalyst, component a of which has been prepared by reacting the magnesium alkoxide dispersion with a titanium compound and then with a chlorine-containing organoaluminum compound wherein said chlorine-containing organoaluminum compound is $(R^3)_2AlCl$ or $(R^3)_3Al_2Cl_3$ in which $R^3$ is an alkly radical having from 1 to 16 carbon atoms.

2. The process as claimed in claim 1, wherein the magnesium alkoxide is $Mg(OC_2H_5)$, $Mg(OnC_3H_7)_2$ or $Mg(OiC_3H_7)_2$.

3. The process as claimed in claim 1, wherein the chlorine-containing organoaluminum compound is ethylaluminum sesquichloride, $(C_2H_5)_3Al_2Cl_3$.

4. The process as claimed in claim 1, wherein said ethylene polymer has a viscosity number of less than 80 cm³/g.

5. The process as claimed in claim 1, wherein said polymerization is carried out at a temperature from 20 to 83° C.

6. The process as claimed in claim 2, wherein said magnesium alkoxide is reacted with 0.1 to 2 mol of titanium compound per mol of magnesium alkoxide at a temperature of from 60 to 90° C. for 2 to 6 hours, in the presence of a saturated hydrocarbon to form a suspension, and said suspension is reacted with 0.5 to 2.0 mol of ethyl aluminum sesquichloride per mol of magnesium, at a temperature from 80 to 120° C. for a period of 0.5 to 6 hours.

7. The process as claimed in claim 1, wherein said organo aluminum compound (component B) is triethylaluminum.

8. The process as claimed in claim 1, wherein the chlorine-containing organoaluminum compound is ethylaluminum sesquichloride, $(C_2H_5)_3Al_2Cl_3$ and the magesium alkoxide is $Mg(OC_2H_5)_2$, $Mg(OnC_3H_7)_2$ or $Mg(OiC_3H_7)_2$.

9. A process for producing a low molecular-weight ethylene polymer having a viscosity number of less than 100 cm³/g by homopolymerization of ethylene or copolymerization thereof with up to 20% by weight of 1-olefin having the formula $R^4$—CH═CH_2, in which $R^4$ is a hydrogen atom or an alkyl radical having from 1 to 10 carbon atoms, comprising in a first step reacting a dispersion of a magnesium alkoxide having the formula $Mg(OR^1)(OR^2)$ in which $R^1$ and $R^2$ are identical or different and are an alkyl radical having from 1 to 6 carbon atoms, the particle size of which is from 100 to 3000 nm, with a titanium compound which is $TiCl_4$ a temperature from 50 to 100° C. in the presence of a saturated hydrocarbon or hydrocarbon mixture to form a suspension, in a second step, reacting said suspension at a temperature of from 60 to 140° C. over a time period of 0.2 to 8 hours with a chlorine-containing organoaluminum component of the formula $(R^3)_2Al$ Cl or $(R^3)_3Al_2Cl_3$ in which $R^3$ is an alkyl radical having from 1 to 16 carbon atoms in a ratio of from 0.3 to 3 mol of aluminum per mol of magnesium which results in an hydrocarbon insoluble, magnesium and titanium-containing solid which forms component a), reacting component a) with an organoaluminum compound (component b) wherein said organoaluminum compound is $AlR^3{}_3$, $AlR^3{}_2Cl$, $Al_2R^3{}_3Cl_2$, or $AlR^3{}_2H$ in which $R^3$ is identical or different and are an alkyl radical having from 1 to 16 carbon atoms, to form a catalyst and carrying out the polymerization of said 1-olefin in a suspension at a pressure of from 0.5 to 50 bar in the presence of hydrogen and in the presence of said catalyst.

10. The process as claimed in claim 9, wherein the temperature in the first step is from 60 to 90° C. over a time period of from 2 to 6 hours with a ratio of from 0.1 to 5 mol of said titanium compound to one mol of magnesium alkoxide.

11. The process as claimed in claim 9, wherein the temperature in the second step is from 80 to 120° C. over a time period of from 0.5 to 6 hours with an organoaluminuin component in a ratio of form 0.5 to 2 mol of aluminum per mol of magnesium.

12. The process as claimed in claim 11, wherein the temperature in the first step is from 60 to 90° C. over a time period of from 2 to 6 hours with a ratio of from 0.1 to 2 mol of said titanium metal compound to one mol of magnesium alkoxide.

13. The process as claimed in claim 9, wherein said organo aluminum compound (component B) is triethylaluminum.

14. The process as claimed in claim 9, wherein the chlorine-containing organoaluminum compound is ethylaluminum sesquichloride, $(C_2H_5)_3Al_2Cl_3$ and the magnesium alkoxide, is $Mg(OC_2H_5)_2$, $Mg(OnC_3H_7)_2$ or $Mg(OiC_3H_7)_2$.

15. The process as claimed in claim 14, wherein the temperature in the first step is from 60 to 90° C. over a time period of from 2 to 6 hours with a ratio of from 0. 1 to 2 mol of said titanium compound to one mol of magnesium alkoxide and the temperature in the second step is from 80 to 120° C. over a time period of from 0.5 to 6 hours with the organoaluminum component in a ratio of from 0.5 to 2 mol of aluminum per mol magnesium.

16. The process as caimed in claim 9, wherein the organoaluminum compound is $AlR^3_3$ or $AlR^3_2H$.

* * * * *